United States Patent
Huang et al.

(10) Patent No.: US 9,710,284 B1
(45) Date of Patent: Jul. 18, 2017

(54) SYSTEM FOR PROGRAMMABLY CONFIGURING A MOTHERBOARD

(71) Applicant: MITAC COMPUTING TECHNOLOGY CORPORATION, Hsinchu (TW)

(72) Inventors: Bo-Wen Huang, Hsinchu (TW); Kei-Way Chang, Hsinchu (TW); Shih-Ta Chu, Hsinchu (TW); Jun-Jie Wu, Hsinchu (TW); Chen-Nan Hsiao, New Taipei (TW)

(73) Assignee: Mitac Computing Technology Corporation, Hsinchu (TW)

( * ) Notice: Subject to any disclaimer, the term of this patent is extended or adjusted under 35 U.S.C. 154(b) by 0 days.

(21) Appl. No.: 15/013,832

(22) Filed: Feb. 2, 2016

(51) Int. Cl.
  *G06F 15/177* (2006.01)
  *G06F 9/44* (2006.01)
  *G06F 9/445* (2006.01)

(52) U.S. Cl.
  CPC .............. *G06F 9/4403* (2013.01); *G06F 8/65* (2013.01)

(58) Field of Classification Search
  CPC .................................. G06F 9/4403; G06F 8/65
  See application file for complete search history.

(56) References Cited

U.S. PATENT DOCUMENTS

| 7,293,165 B1 * | 11/2007 | Tobias ...................... G06F 8/66 713/1 |
| 9,122,501 B1 * | 9/2015 | Hsu ...................... G06F 9/44505 |
| 2004/0088533 A1 * | 5/2004 | Chuang .................. G06F 3/0614 713/1 |
| 2010/0023682 A1 | 1/2010 | Lee et al. |
| 2011/0093647 A1 | 4/2011 | Lai et al. |
| 2013/0254527 A1 * | 9/2013 | Zhang ..................... G06F 8/665 713/100 |

FOREIGN PATENT DOCUMENTS

TW        I298443 B       7/2008

OTHER PUBLICATIONS

Search Report from the Taiwanese Patent Office for Application No. 104130104, dated Mar. 21, 2016 (2 pages).

* cited by examiner

*Primary Examiner* — Mark Connolly
(74) *Attorney, Agent, or Firm* — Michael Best & Friedrich LLP (57) ABSTRACT

A system includes a programmable non-volatile memory, a switch, a control chipset, and a basic input/output (BIOS) module. The switch has a first terminal coupled to the programmable non-volatile memory, and a second terminal coupled to the control chipset. The control chipset is configured to store a SKU parameter set in the programmable non-volatile memory according to a predetermined memory allocation. The BIOS module is coupled to the control chipset, and is configured to load and update the SKU parameter set according to the predetermined memory configuration during a booting operation of the motherboard.

7 Claims, 8 Drawing Sheets

| Start address | segment length | SKU parameter | value |
|---|---|---|---|
| 0 | 1 | SKU ID | 0x01 |
| 1 | 2 | Product ID | 0x7051 |
| 3 | 28 | Version code | "B7051G86AW6-1T-HE-DJ" |
| 31 | 1 | Fan table | 0x01 |
| 32 | 2 | Chassis ID | 0x1122 |
| 34 | 10 | Chassis string | "YR292-B7051" |

SYSTEM FOR PROGRAMMABLY CONFIGURING A MOTHERBOARD

FIELD

The disclosure relates to a system for configuring a motherboard.

BACKGROUND

In the developing and production of a server system, a number of specifications are to be considered. For example, functionalities of components in the server system (e.g., a backplane, a chassis, a fan, a heat ventilation component, etc.) may be adjusted. A parameter set may be established for each particular set of specifications, and stored in a motherboard of the server system. Server system(s) that applies one particular parameter set may be referred to as a stock keeping unit (SKU).

Generally, the SKU parameter set is stored together with other information including, for example, a SKU identification number, a board identification number, a project identification number, a banner, a table for specifying a rotation speed of the fan, a chassis identification number, a chassis string, etc. Such information is typically referred to as "SKU parameter sets". One client of a server system manufacturer may order server systems with several different sets of specifications; the server system manufacturer may store multiple corresponding SKU parameter sets in all motherboards manufactured for this client.

Figure 1:
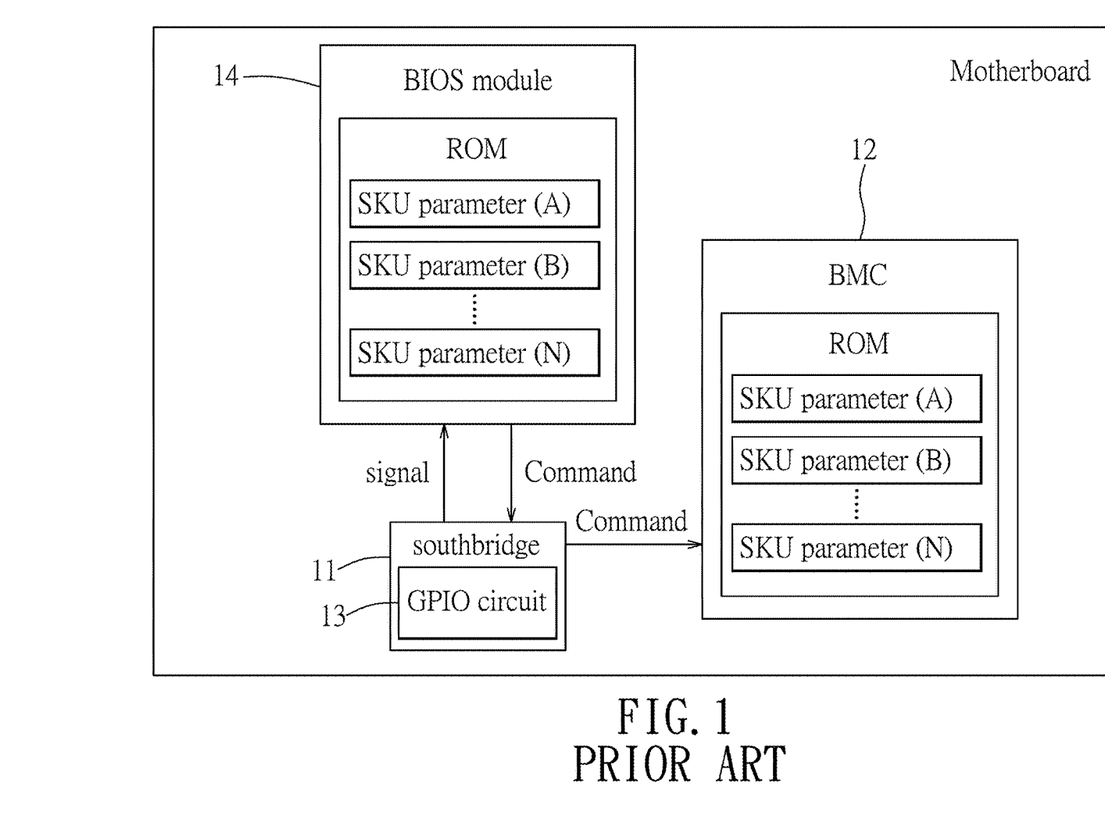
FIG. 1 is a block diagram illustrating a conventional motherboard.

FIG. 1 illustrates a conventional motherboard. The motherboard includes a baseboard management controller (BMC) 12, a basic input/output system (BIOS) module 14, and a southbridge 11 interconnecting the BMC 12 and the BIOS module 14. Each of the BMC 12 and the BIOS module 14 includes a read-only memory (ROM) for storing a number (N) of SKU parameter sets, labeled herein as (A), (B), . . . , (N).

When the BIOS module 14 is to execute a booting operation, a general propose input/output (GPIO) circuit 13 in the southbridge 11 transmits a signal to the BIOS module 14 indicating a specific one of the SKU parameter sets (e.g., the SKU parameter set (A)).

In response, the BIOS module 14 may display the specific one of the SKU parameter sets on a display screen (not depicted in the drawings).

Additionally, the BIOS module 14 transmits a signal to the BMC 12 via the southbridge 11, requesting information including, for example, the SKU parameter set (A), from the ROM of the BMC 12. This action is executed after a predetermined time period has elapsed (a time period during which the BMC 12 completes an initialization process after being powered-on) since that the BMC 12 may not be operational before the initialization process is completed. As a result, the BIOS module 14 is able to initiate the components of the server system using the SKU parameter set (A) to complete the booting operation.

It is noted that, when additional SKU parameter set(s) is to be incorporated into the motherboard (e.g., server systems of other specifications are to be made as ordered by the client, or, the SKU parameter set information is slightly changed), since that content stored in the ROM may not be modified, the BMC 12 and the BIOS module 14 have to be remade/reworked to incorporate the additional SKU parameter set(s) into the ROMs thereof.

Typically, the remake of each of the BMC 12 and the BIOS module 14 involves physically removing the ROM, connecting a replacement ROM to each of the BMC 12 and the BIOS module 14, and performing tests after the connection. As a result, the manufacturer has to spend much time and considerable cost when a further specification with a new SKU parameter set is intended to be added.

SUMMARY

Therefore, an object of the disclosure is to provide a system for programmably configuring a motherboard.

According to one aspect of the disclosure, the system includes a programmable non-volatile memory, a switch, a control chipset, and a basic input/output system (BIOS) module.

The switch has a first terminal coupled to the programmable non-volatile memory, and a second terminal.

The control chipset is coupled to the second terminal of the switch. The control chipset is further configured to receive a stock keeping unit (SKU) parameter set, and to store the SKU parameter set in the memory segment of the programmable non-volatile memory according to a predetermined memory allocation when an electrical connection between the first and second terminals of the switch is established. The predetermined memory allocation includes a start address and a segment length associated with a memory segment of the programmable non-volatile memory. The SKU parameter set includes at least one SKU parameter for configuring the motherboard.

The BIOS module is coupled to the control chipset, and stores the predetermined memory allocation therein. The BIOS module is further configured to load the SKU parameter set from the programmable non-volatile memory according to the predetermined memory allocation, and to update the SKU parameter set stored therein during a booting operation of the motherboard.

According to another aspect of the disclosure, the system is to be coupled to a remote server that stores a stock keeping unit (SKU) parameter set therein. The SKU parameter set includes at least one SKU parameter for configuring the motherboard. The system includes a programmable non-volatile memory, a switch, a control chipset, a baseboard management controller (BMC), and a basic input/output system (BIOS) module.

The switch has a first terminal coupled to the programmable non-volatile memory, a second terminal, and a third terminal.

The control chipset is coupled to the second terminal of the switch.

The BMC is coupled to the third terminal of the switch and the control chipset, receives the SKU parameter set from the remote server, and stores a predetermined memory allocation therein. The predetermined memory allocation includes a start address and a segment length which are associated with a memory segment of the programmable non-volatile memory. When an electrical connection between the first and third terminals of the switch is established, the BMC is configured to store the SKU parameter set into the programmable non-volatile memory, according to the predetermined memory allocation.

The BIOS module is coupled to the control chipset, and stores the predetermined memory allocation therein. During a booting operation of the motherboard, when an electrical connection between the first and second terminals of the switch is established, the BIOS module is configured to load the SKU parameter set from the programmable non-volatile memory according to the predetermined memory allocation and to update the SKU parameter set stored therein.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that like elements are denoted by the same reference numerals throughout the disclosure.

Figure 2:
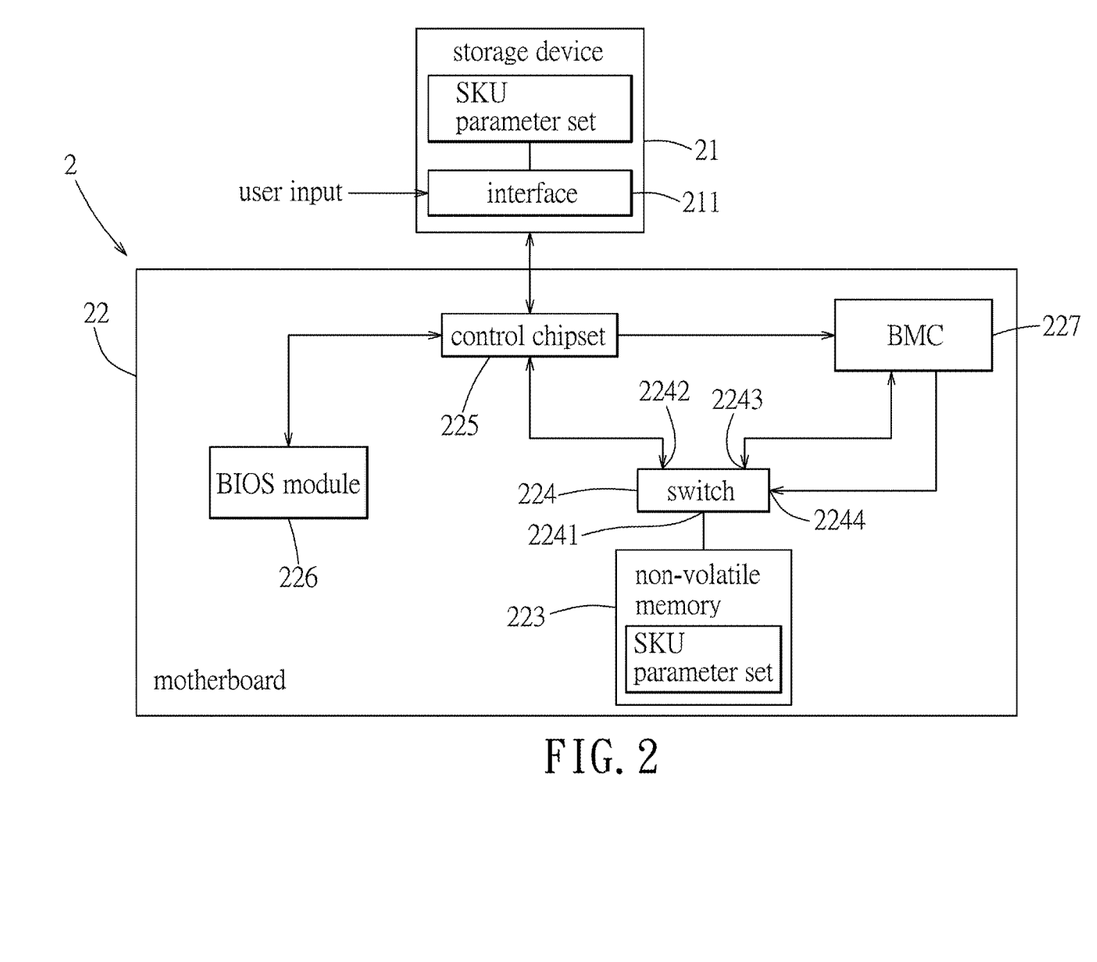
FIG. 2 is a block diagram illustrating a system for configuring a motherboard, according to one embodiment of the disclosure.

FIG. 2 illustrates a system 2 for programmably configuring a motherboard, according to one embodiment of the disclosure. The system 2 in embodiments of the disclosure conforms with the intelligent platform management interface (IPMI) specification.

The system 2 includes a storage device 21 and a motherboard 22. It is worth noting that, the storage device 21 is external to the motherboard 22. That is, the storage device 21 is not integrated with the motherboard 22, and may be coupled to the motherboard 22 using a universal serial bus (USB) port.

The storage device 21 includes an interface 211, and stores a stock keeping unit (SKU) parameter set therein. The SKU parameter set includes at least one SKU parameter for configuring the motherboard 22.

The interface 211 allows a user to manually adjust the values of the at least one SKU parameter included in the SKU parameter set so as to update the SKU parameter set. In one embodiment, the interface 211 is implemented using a Linux utility program.

The motherboard 22 includes a programmable non-volatile memory 223, a switch 224, a control chipset 225, a basic input/output system (BIOS) module 226, and a baseboard management controller (BMC) 227.

In one embodiment, the programmable non-volatile memory 223 is implemented using an electrically-erasable programmable read-only memory (EEPROM), and is configured to serve as a motherboard field-replaceable unit (FRU) of the motherboard 22.

The programmable non-volatile memory 223 is to store the at least one SKU parameter. In one embodiment, the at least one configuration parameter includes a SKU identification number, a board identification number, a project identification number, a banner, a table for specifying a rotation speed of the fan, a chassis identification number, a chassis string, or a combination thereof.

Figure 3:
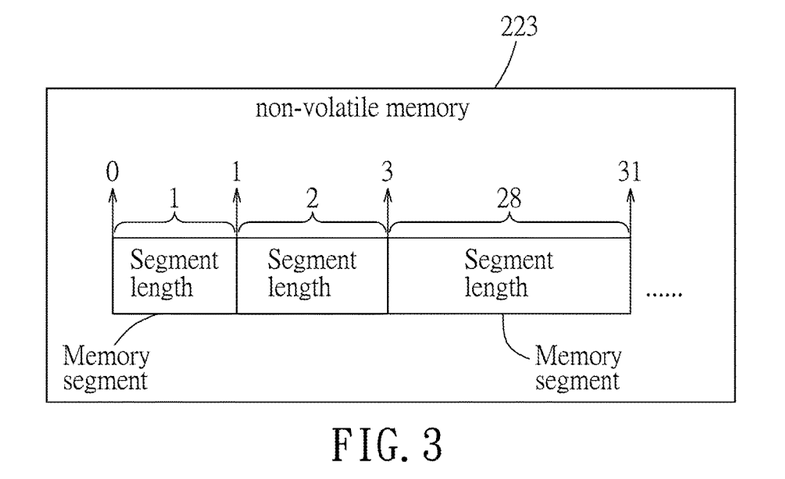
FIG. 3 illustrates memory segments of a programmable non-volatile memory included in the system.
Figure 4:
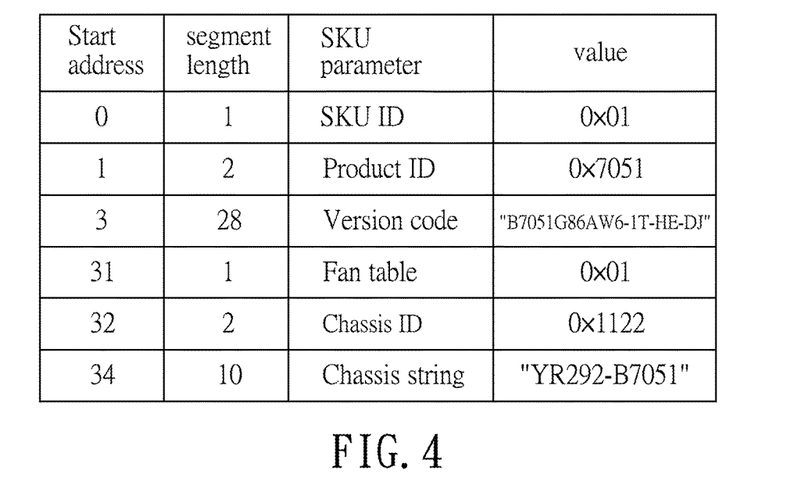
FIG. 4 illustrates an exemplary predetermined memory allocation.

The manner in which the programmable non-volatile memory 223 stores data may be indicated by a predetermined memory allocation. For example, a programmable non-volatile memory 223 having a 255-byte size may be allocated in the following manner (see FIG. 3) for storing the SKU parameter set. At a start address 0, the SKU identification number (having a length of one byte) is to be stored. As a result, a memory segment of one byte, starting from the address 0, may be allocated to store the SKU identification number. Accordingly, the predetermined memory allocation (see FIG. 4) may contain the information including the start address (0), a segment length (1), and the SKU parameter that is to be stored (the SKU identification number, 0x01). Similarly, other SKU parameters may be stored in the programmable non-volatile memory 223 as indicated by the predetermined memory allocation as illustrated in FIG. 4. For example, the product identification number, having a value of 0x7051 and a length of 2 bytes, may be allocated after the SKU identification number. That is to say, a memory segment of two bytes, starting from the address 1, may be allocated to store the product identification number. Another memory segment of 28 bytes, starting from the address 3, may be allocated to store the version code "B7051G86AW6-1T-HE-DJ". Some or all of the 255-byte size storage of the programmable non-volatile memory 223 may be used.

As such, the predetermined memory allocation includes a plurality of start addresses and a plurality of segment lengths, each one of the plurality of start addresses and the plurality of segment lengths being associated respectively with a plurality of memory segments in the programmable non-volatile memory 223 for storing the SKU parameter set.

It is noted that, in planning the predetermined memory allocation additional space may be reserved for each of the SKU parameters in order to accommodate potential updates that may need additional storage space. For example, a memory segment having a length of 2 bytes may be reserved for the SKU identification number.

The switch 224 is a switch positioned on an inter-integrated circuit ($I^2C$) bus (not depicted in the drawings) and conforms with $I^2C$ protocol. The switch 224 includes a first terminal 2241, a second terminal 2242, a third terminal 2243, and a control terminal 2244. In various embodiments, the control terminal 2244 of switch 224 is configured to operate the switch 224 in one of a first state, in which an electrical connection between the first terminal 2241 and the second terminal 2242 is established, and a second state, in which an electrical connection between the first terminal 2241 and the third terminal 2243 is established. In one embodiment, the first terminal 2241 is electrically connected to the programmable non-volatile memory 223. In one embodiment, no electrical connection between the first terminal 2241 and the third terminal 2243 is established when the switch 224 operates in the first state, and no electrical connection between the first terminal 2241 and the second terminal 2242 is established when the switch 224 operates in the second state.

The control chipset 225 is implemented using a platform controller hub (PCH) so as to be compatible to various processor instruction set architectures (e.g., the x86 family). In one embodiment, the control chipset 225 is coupled to the second terminal 2242 of the switch 224 and the storage device 21, and is capable of communicating with the programmable non-volatile memory 223 via the switch 224 when an electrical connection between the first terminal 2241 and the second terminal 2242 is established.

The BIOS module 226 is coupled to the control chipset 225, and stores the predetermined memory allocation therein. In one embodiment, the communication between the BIOS module 226 and the control chipset 225 may be implemented using a general propose input/output (GPIO) pin (not depicted in the drawings) disposed on the motherboard 22.

The BMC 227 is coupled to the third terminal 2243 and the control terminal 2244 of the switch 224, and the control chipset 225. By transmitting a signal to the control terminal 2244, the BMC 227 is able to control the switch 224 to operate in one of the first state and the second state. In one embodiment, the BMC 227 is capable of communicating with the BIOS module 226 via the control chipset 225 using IPMI commands, and the communication between the BMC 227 and the control chipset 225 is implemented using a low pin count (LPC) bus disposed on the motherboard 22.

The BMC 227 stores the predetermined memory allocation therein, and is capable of communicating with the programmable non-volatile memory 223 via the switch 224 when an electrical connection between the first terminal 2241 and the third terminal 2243 is established (i.e., when the switch 224 operates in the second state).

The BIOS module 226 and the BMC 227 both store the SKU parameter set therein.

Figure 5:
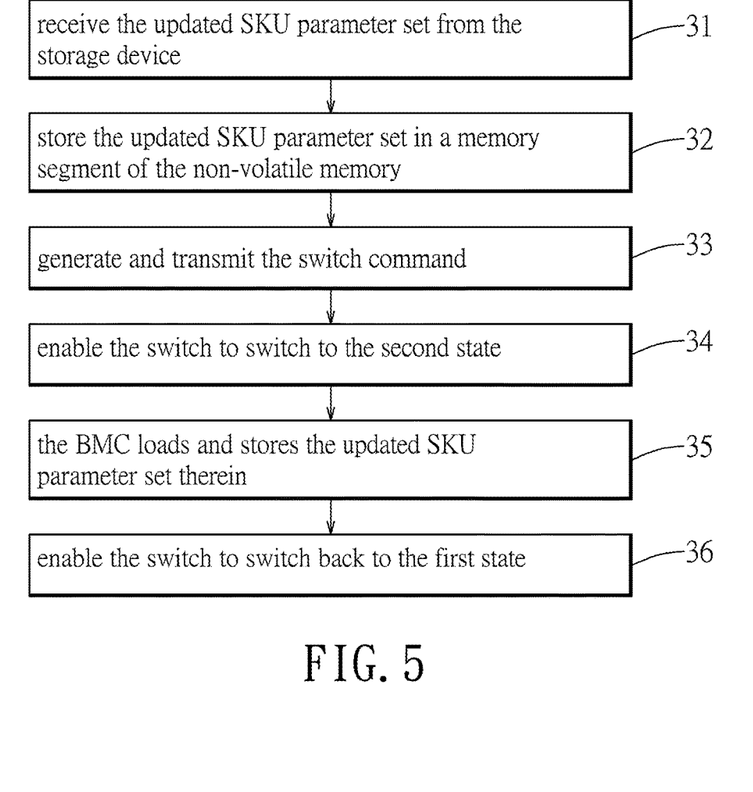
FIG. 5 illustrates steps of an update process for configuring the motherboard to be implemented using the system as shown in FIG. 2, according to one embodiment of the disclosure.

FIG. 5 illustrates steps of an update process for configuring the motherboard 22, to be implemented using the system as shown in FIG. 2, according to one embodiment of the disclosure. In the update process, the user intends to update the SKU parameter set that is stored in the BMC 227 from the storage device 21, and to store the SKU parameter set into the programmable non-volatile memory 223.

In order to do so, the user operates the interface 211 of the storage device 21, so as to update the SKU parameter set stored in the storage device 21. In this embodiment, the interface 211 is provided with a list of the SKU parameters, such that the user may check one or more of the SKU parameters and adjust the value(s) of the one or more of the SKU parameters. In response, the interface 211 (implemented by a Linux utility) is configured to export an updated SKU parameter set.

In step 31, the control chipset 225 receives the updated SKU parameter set from the storage device 21.

Afterward, in step 32, when an electrical connection between the first terminal 2241 and the second terminal 2242 of the switch 224 is established, the control chipset 225 stores the updated SKU parameter set in a memory segment of the programmable non-volatile memory 223, according to the predetermined memory allocation. In one embodiment, the switch 224 is switched to the first state when an electrical connection between the storage device 21 and the control chipset 225. In another embodiment, the user may manually transmit a command to inform the system that the update process is to be initiated, and the switch 224 is switched to the first state as a result.

In step 33, the interface 211 of the storage device 21 generates a switch command, and transmits the switch command to the control chipset 225. In response, the control chipset 225 relays the switch command to the BMC 227.

In step 34, after receiving the switch command from the control chipset 225, the BMC 227 transmits a signal to the control terminal 2242 so as to enable the switch 224 to electrically connect the first terminal 2241 and the third terminal 2243 (i.e., to switch to the second state). Essentially, the switch command enables the switch 224 to switch from the first state to the second state.

In step 35, the BMC 227 loads the updated SKU parameter set from the programmable non-volatile memory 223, according to the predetermined memory allocation. Afterward, the BMC 227 stores the updated SKU parameter set therein (that is, to update the SKU parameter set that is originally stored in the BMC 227).

Then, in step 36, the BMC 227 generates a signal and transmits the signal to the control terminal 2244, so as to enable the switch 224 to switch back to the first state.

In such a state, the system 2 is available to perform the update process again. That is to say, when additional SKU parameter is intended to be updated for the BMC 227, the update process may be handily performed to first store the updated SKU parameter set into the programmable non-volatile memory 223, and then load and store the updated SKU parameter set into the BMC 227 by the switching of the switch 224.

It is noted that, in order for the update process to complete and take effect, the system may be required to shut down and reboot.

Figure 6:
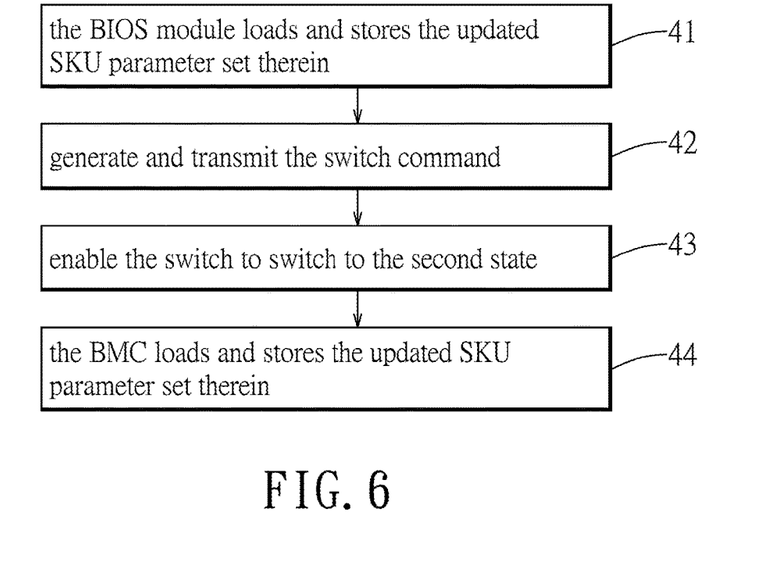
FIG. 6 illustrates steps of a data setting process to be implemented using the system as shown in FIG. 2, according to one embodiment of the disclosure.

FIG. 6 illustrates steps of a data setting process to be implemented using the system 2 as shown in FIG. 2, according to one embodiment of the disclosure. The data setting process is carried out when the motherboard 22 is executing a booting operation after the update process (i.e., the "reboot operation"), and the user intends to update the SKU parameter set that is stored in the BIOS module 226 and the BMC 227. Accordingly, the user may operate the interface 211 to update the SKU parameter set that is stored in the storage device 21 before the booting operation. The updated SKU parameter set is then stored in the programmable non-volatile memory 223.

Then, in step 41, during the booting operation, the BIOS module 226 loads the updated SKU parameter set from the programmable non-volatile memory 223 via the control chipset 225 according to the predetermined memory allocation, and stores the updated SKU parameter set therein.

In step 42, the BIOS module 226 generates a switch command and transmits the switch command to the control chipset 225. Then, the control chipset 225 relays the switch command to the BMC 227.

In step 43, the BMC 227 transmits a signal to the control terminal 2244 of the switch 224 so as to enable the switch 224 to switch to the second state.

In step 44, the BMC 227 loads the updated SKU parameter set from the programmable non-volatile memory 223, according to the predetermined memory allocation. It is noted that this step is carried out to accommodate the case that the BMC 227 employs volatile memory for storing the SKU parameter set.

Figure 7:
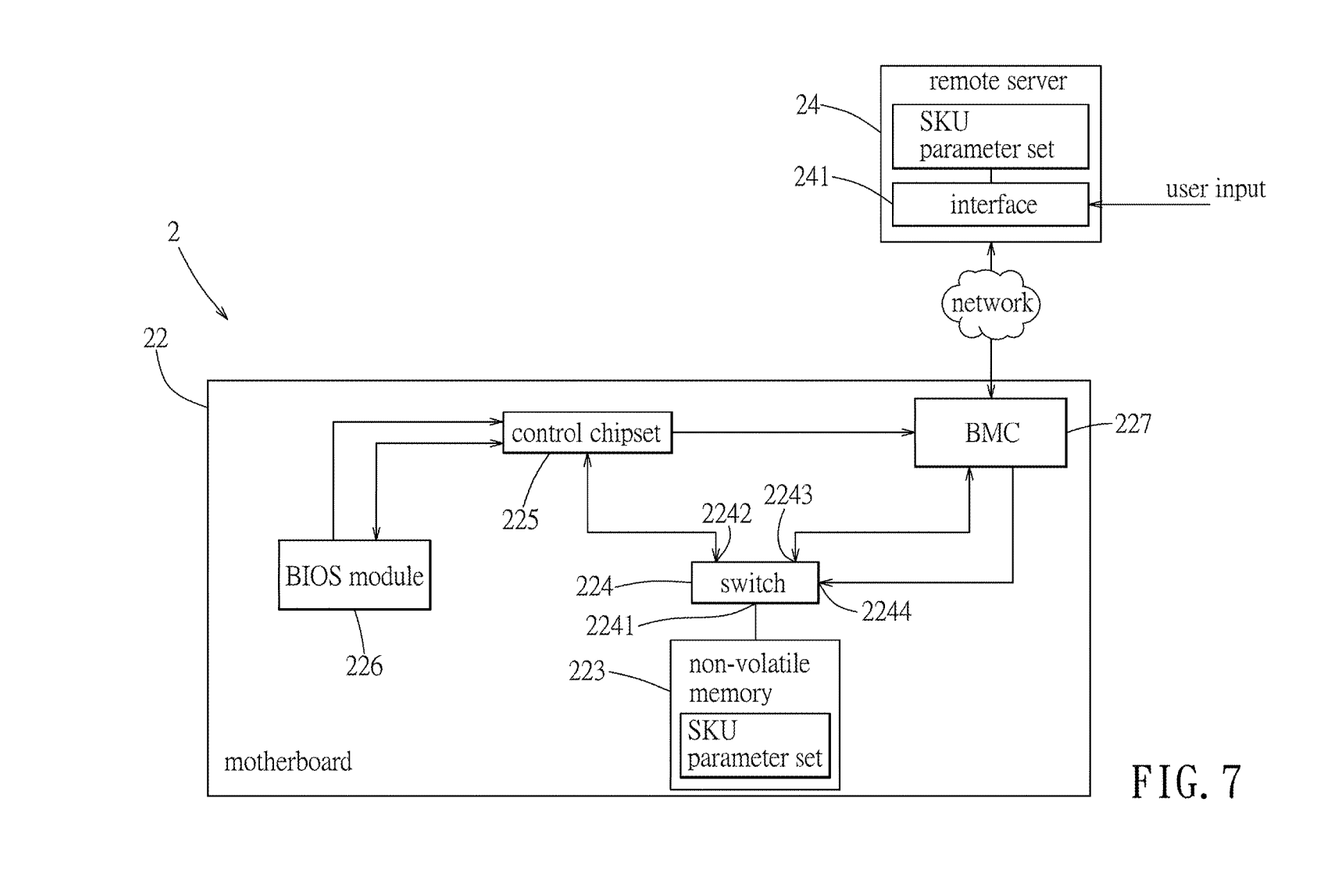
FIG. 7 illustrates a system for configuring the motherboard, according to one embodiment of the disclosure.

FIG. 7 illustrates a system 2 for configuring the motherboard 22, according to one embodiment of the disclosure.

In the embodiment illustrated by FIG. 7, the system includes the motherboard 22 and a remote server 24 coupled to the motherboard 22. The structure of the motherboard 22 is similar to that illustrated by FIG. 2.

The remote server 24 includes an interface 241, stores the SKU parameter set therein, and is capable of communicating with the BMC 227 via a network.

Figure 8:
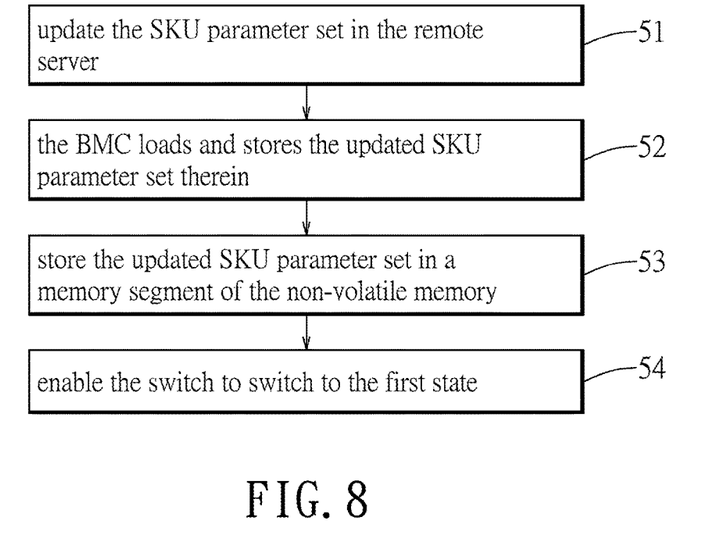
FIG. 8 illustrates steps of an update process for configuring the motherboard to be implemented using the system as shown in FIG. 7, according to one embodiment of the disclosure.

FIG. 8 illustrates steps of an update process for configuring the motherboard 22 to be implemented using the system 2 as shown in FIG. 7, according to one embodiment of the disclosure. In the update process, the user intends to update the SKU parameter set that is stored in the BMC 227 via the remote server 24.

In order to do so, in step 51, the user operates the interface 241 of the remote server 24 so as to update the SKU parameter set stored in the remote server 24.

Afterward, in step 52, the BMC 227 receives the updated SKU parameter set from the remote server 24, and stores the updated SKU parameter set therein.

In step 53, the BMC 227 stores the updated SKU parameter set into the programmable non-volatile memory 223 according to the predetermined memory allocation.

In step 54, the BMC 227 generates a signal, and transmits the signal to the control terminal 2244 for enabling the switch 224 to switch back to the first state. In this manner, when the system 2 is coupled to the storage device 21 (see FIG. 2) thereafter, the update process may be performed by the user operating the interface 211.

It is noted that, in order for the update process to complete and take effect, the system may be required to shut down and reboot.

Figure 9:
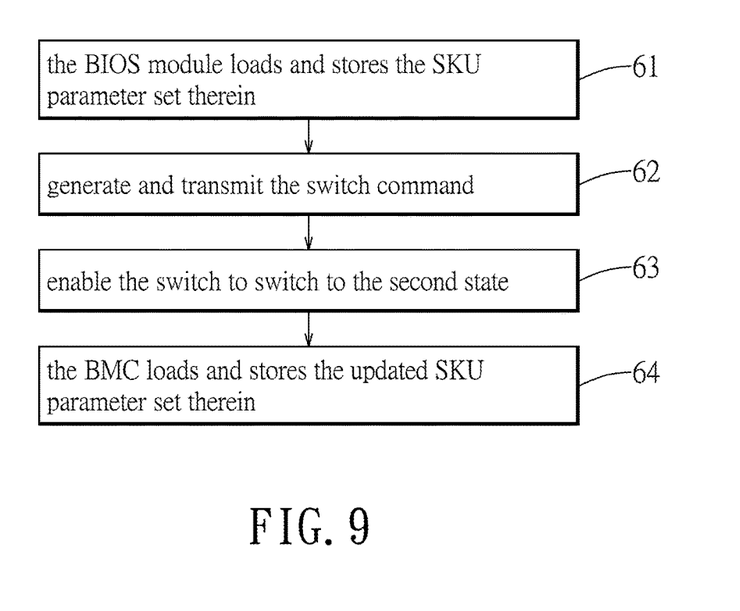
FIG. 9 illustrates steps of a data setting process to be implemented using the system as shown in FIG. 7, according to one embodiment of the disclosure.

FIG. 9 illustrates steps of a data setting process to be implemented using the system 2 as shown in FIG. 7, according to one embodiment of the disclosure. The data setting process is carried out when the motherboard 22 is executing a booting operation, and the user intends to update the SKU parameter set that is stored in the BIOS module 226 and the BMC 227. Accordingly, the user may perform the update process and have the SKU parameter set stored in the programmable non-volatile memory 223 updated before the booting operation.

Then, in step 61, during the booting operation, the BIOS module 226 loads the SKU parameter set from the programmable non-volatile memory 223 according to the predetermined memory configuration, and stores the SKU parameter set therein.

In step 62, the BIOS module 226 generates a switch command and transmits the switch command to the control chipset 225. Then, the control chipset 225 relays the switch command to the BMC 227.

In step 63, the BMC 227 transmits a signal to the control terminal 2244 of the switch 224 so as to enable the switch 224 to switch to the second state.

In step 64, the BMC 227 loads the SKU parameter set from the programmable non-volatile memory 223, according to the predetermined memory allocation. Afterward, the BMC 227 stores the SKU parameter set therein. Similar to step 44, this step is carried out to accommodate the case that the BMC 227 employs volatile memory for storing the SKU parameter set.

In one embodiment, after storing the (updated) SKU parameter set, each one of the BIOS module 226 and the BMC 227 may be configured to export the SKU parameter set as a text file. As a result, when a large number of motherboards 22 have undergone the processes as described above, the user may verify the result of the processes by simply viewing the text file(s) containing the updated SKU parameter set instead of manually performing testing procedures.

In brief, the data setting process is configured to be implemented during the booting operation, such that whenever new content in the SKU parameter set is introduced by the user using the interface 211, 241 (depending on whether the user operates the storage device 21 or the remote server 24), the BIOS module 226 and/or the BMC 227 are able to obtain the new content in the data setting process during the booting operation. In this manner, after a motherboard is manufactured, the BIOS module 226 and/or the BMC 227 do not need to be reworked in order to accommodate any change(s) that is implemented thereafter. This may assist in reducing the inventory of the different motherboards since the same motherboard may be utilized for different proposed specifications.

Another effect of the system 2 is that, by controlling the switch 224 to switch between the first state and the second state, the BIOS module 226 and the BMC 227 are able to obtain the SKU parameter set separately without interfering operations of each other. That is to say, the BIOS module 226 does not need to request data from the BMC 227, such that even when the BMC 227 is performing initialization, the booting operation of the motherboard 22 may be carried out.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for configuring a motherboard, said system being connected to a remote server for receiving a SKU parameter set therefrom through a network and comprising:
   a programmable non-volatile memory;
   a switch that has a first terminal coupled to said programmable non-volatile memory, a second terminal, and a third terminal;
   a control chipset that is coupled to said second terminal of said switch;
   a baseboard management controller (BMC) that is coupled to said third terminal of said switch and said control chipset, that receives the SKU parameter set from the remote server, and that stores a predetermined memory allocation therein, wherein when an electrical connection between said first and third terminals of said switch is established, said BMC is configured to store the SKU parameter set into said programmable non-volatile memory according to the predetermined memory allocation, and wherein the SKU parameter set includes a plurality of SKU parameters for configuring the motherboard, the predetermined memory allocation includes a plurality of start addresses and a plurality of segment lengths, each one of the plurality of start addresses and the plurality of segment lengths being associated respectively with a plurality of memory segments in said programmable non-volatile memory for storing one of the plurality of SKU parameters; and
   a basic input/output system (BIOS) module that is coupled to said control chipset, that stores the predetermined memory allocation therein, wherein when an electrical connection between said first and second terminals of said switch is established, said BIOS module is configured to load the SKU parameter set from said programmable non-volatile memory according to the predetermined memory allocation during a booting operation of the motherboard and to update the SKU parameter set stored therein.

2. The system of claim 1, wherein said programmable non-volatile memory is an electrically-erasable programmable read-only memory (EEPROM), and is configured to serve as a motherboard field-replaceable unit (FRU) of the motherboard.

3. The system of claim 1, wherein:
said switch further includes a control terminal coupled to said BMC; and
after said BMC writes the SKU parameter set into said programmable non-volatile memory, said BMC is configured to enable said switch to electrically connect said first terminal and said second terminal.

4. The system of claim 1, wherein:
said switch further includes a control terminal coupled to said BMC to be enabled to electrically connect said first terminal and said second terminal; and
after said BIOS module loads the SKU parameter set from said programmable non-volatile memory, said BIOS module is configured to generate a switch command and to transmit the switch command that enables said switch to electrically connect said first terminal and said third terminal.

5. The system of claim 4, wherein, said BMC is configured to:
receive the switch command from said control chipset;
enable said switch to electrically connect said first terminal and said third terminal according to the switch command;
load the SKU parameter set from said programmable non-volatile memory according to the predetermined memory allocation; and
store the SKU parameter set therein.

6. The system of claim 1, wherein the SKU parameter set received from the remote server is a user-input SKU parameter set.

7. The system of claim 1, wherein the at least one SKU parameter includes a stock keeping unit identification number, a product identification, a version code associated with versions of said BIOS module and said BMC, a chassis identification number, a chassis string, a project identification number, a banner, a table for specifying a rotation speed of a fan, or a combination thereof.

* * * * *

UNITED STATES PATENT AND TRADEMARK OFFICE
CERTIFICATE OF CORRECTION

PATENT NO. : 9,710,284 B1  
APPLICATION NO. : 15/013832  
DATED : July 18, 2017  
INVENTOR(S) : Po-Wen Huang et al.

Page 1 of 1

It is certified that error appears in the above-identified patent and that said Letters Patent is hereby corrected as shown below:

On the Title Page

Item [72], delete "Bo-Wen Huang, Hsinchu (TW)" and insert --Po-Wen Huang, Hsinchu (TW)--

Signed and Sealed this
Second Day of June, 2020

Andrei Iancu
*Director of the United States Patent and Trademark Office*